US009251455B2

(12) United States Patent
Lin et al.

(10) Patent No.: US 9,251,455 B2
(45) Date of Patent: Feb. 2, 2016

(54) USING UNIQUE IDENTIFIERS TO RETRIEVE CONFIGURATION DATA FOR TAG DEVICES

(71) Applicant: Google Inc., Mountain View, CA (US)

(72) Inventors: Alice Lin, Sunnyvale, CA (US); Andrew Nelson, Richmond, CA (US); Daniel Yeager, Berkeley, CA (US); Brian Otis, Sunnyvale, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 168 days.

(21) Appl. No.: 13/973,220

(22) Filed: Aug. 22, 2013

(65) Prior Publication Data

US 2015/0054621 A1 Feb. 26, 2015

(51) Int. Cl.
*H04Q 5/22* (2006.01)
*G06K 19/07* (2006.01)
*G08C 17/02* (2006.01)
*G06Q 10/08* (2012.01)

(52) U.S. Cl.
CPC ........ *G06K 19/0716* (2013.01); *G06K 19/0717* (2013.01); *G06Q 10/0833* (2013.01); *G08C 17/02* (2013.01); *G08C 2201/20* (2013.01)

(58) Field of Classification Search
CPC ........... G06K 19/0716; G06K 19/0717; G08C 17/02; G08C 2201/20; G06Q 10/0833
See application file for complete search history.

(56) References Cited

U.S. PATENT DOCUMENTS

| | | | | |
|---|---|---|---|---|
| 6,677,852 B1* | 1/2004 | Landt | ................... | G06K 7/0008 235/375 |
| 7,026,935 B2* | 4/2006 | Diorio | ................ | G06K 19/0723 340/572.1 |
| 7,075,412 B1* | 7/2006 | Reynolds | ........... | G06K 7/10297 340/10.2 |
| 7,183,924 B1 | 2/2007 | Ku | | |
| 7,323,991 B1* | 1/2008 | Eckert | ................ | G07C 9/00111 235/382 |
| 7,385,477 B2* | 6/2008 | O'Toole | ................ | H03L 7/0995 340/10.2 |

(Continued)

FOREIGN PATENT DOCUMENTS

DE 10 2006 045952 A1 4/2008
WO 2012119128 A1 9/2012

OTHER PUBLICATIONS

International Search Report and Written Opinion of International Application No. PCT/US2014/033994 dated Aug. 27, 2014 (mailed Aug. 27, 2014), 13 pages.

*Primary Examiner* — Jennifer Mehmood
*Assistant Examiner* — Rufus Point
(74) *Attorney, Agent, or Firm* — McDonnell Boehnen Hulbert & Berghoff LLP

(57) ABSTRACT

Methods and systems for using unique identifiers to retrieve configuration data for tag devices are described herein. An example method may involve obtaining a unique identifier associated with a tag device. The tag device may include an antenna and a sensor configured to obtain sensor readings that can be wirelessly transmitted to a reader device via the antenna. The method may also involve determining configuration parameters associated with the tag device based on the unique identifier. The method may further involve storing, in at least one memory, at least a portion of the configuration parameters in association with the unique identifier.

26 Claims, 5 Drawing Sheets

(56) References Cited

U.S. PATENT DOCUMENTS

| | | | | |
|---|---|---|---|---|
| 7,588,185 B2* | 9/2009 | Berquist | G07G 1/0045 | 235/383 |
| 8,115,632 B1* | 2/2012 | Rahimi | G06K 7/10198 | 340/10.1 |
| 8,471,708 B1* | 6/2013 | Diorio | G06K 7/10009 | 340/10.2 |
| 8,988,200 B2* | 3/2015 | Lee | G06K 1/18 | 235/384 |
| 2003/0080862 A1 | 5/2003 | Kranz | | |
| 2003/0133435 A1* | 7/2003 | Friedrich | G06K 7/0008 | 370/349 |
| 2004/0160324 A1* | 8/2004 | Stilp | G08B 25/008 | 340/572.1 |
| 2005/0225435 A1* | 10/2005 | Diorio | G06K 19/0723 | 340/10.5 |
| 2005/0225447 A1* | 10/2005 | Diorio | G06K 7/10297 | 340/572.4 |
| 2006/0238302 A1* | 10/2006 | Loving | G06K 7/0008 | 340/10.1 |
| 2006/0238304 A1* | 10/2006 | Loving | G06K 7/0008 | 340/10.1 |
| 2006/0238305 A1* | 10/2006 | Loving | G06K 7/0008 | 340/10.1 |
| 2006/0266837 A1* | 11/2006 | Madej | G06K 7/14 | 235/462.25 |
| 2006/0267772 A1* | 11/2006 | Knadle, Jr. | G06K 7/0004 | 340/572.4 |
| 2007/0038516 A1* | 2/2007 | Apple | G06Q 30/0243 | 705/14.42 |
| 2007/0069027 A1* | 3/2007 | Madej | G06K 7/10851 | 235/462.32 |
| 2007/0103303 A1* | 5/2007 | Shoarinejad | G01S 19/05 | 340/572.1 |
| 2007/0126586 A1* | 6/2007 | Ohtaka | G06K 19/07749 | 340/572.7 |
| 2007/0210158 A1 | 9/2007 | Miller | | |
| 2007/0236332 A1* | 10/2007 | Quan | G01S 21/00 | 340/10.1 |
| 2007/0274626 A1 | 11/2007 | Sabeta | | |
| 2008/0186139 A1* | 8/2008 | Butler | G06K 19/0723 | 340/10.1 |
| 2008/0252459 A1* | 10/2008 | Butler | G06K 7/0008 | 340/572.1 |
| 2009/0273473 A1* | 11/2009 | Tuttle | G06K 7/0008 | 340/572.1 |
| 2010/0073138 A1* | 3/2010 | Suzuki | G06K 7/10297 | 340/10.1 |
| 2011/0057779 A1* | 3/2011 | Canard | H04L 9/3236 | 340/10.42 |
| 2011/0084834 A1 | 4/2011 | Sabeta | | |
| 2011/0148570 A1* | 6/2011 | Weidinger | G06K 7/0008 | 340/5.8 |
| 2012/0256729 A1* | 10/2012 | Kang | G06Q 10/00 | 340/10.1 |
| 2012/0322380 A1 | 12/2012 | Nannarone et al. | | |
| 2014/0084060 A1* | 3/2014 | Jain | G06Q 10/087 | 235/385 |
| 2014/0159876 A1* | 6/2014 | Oh | G06K 7/10198 | 340/10.51 |
| 2014/0266626 A1* | 9/2014 | Moulin | G06F 19/3456 | 340/10.1 |

\* cited by examiner

USING UNIQUE IDENTIFIERS TO RETRIEVE CONFIGURATION DATA FOR TAG DEVICES

BACKGROUND

Unless otherwise indicated herein, the materials described in this section are not prior art to the claims in this application and are not admitted to be prior art by inclusion in this section.

Radio-frequency identification (RFID) systems implement wireless transference of data utilizing radio-frequency (RF) electromagnetic fields. Such systems may include a reader device, often referred to as an "interrogator," and a tag device, often referred to as a "label." In some scenarios, RFID tag devices can be included in objects in order to identify and/or track the objects using the reader device.

RFID systems can be classified by whether the tag device is "active" or "passive." In an example system, a reader device may transmit an RF interrogator signal to a passive tag device, thereby directing the passive tag device to reply to the interrogator signal by transmitting an information signal back to the reader device.

SUMMARY

In a first aspect, a method is provided. The method includes obtaining a unique identifier associated with a tag device, where the tag device includes an antenna and a sensor configured to obtain sensor readings that can be wirelessly transmitted to a reader device via the antenna. The method also includes determining, based on the unique identifier, configuration parameters associated with the tag device. The method further includes storing, in at least one memory, at least a portion of the configuration parameters in association with the unique identifier.

In a second aspect, a computing device is provided. The computing device comprises at least one radio frequency (RF) transceiver unit, at least one processor, and at least one memory, where the at least one memory stores instructions that upon execution by the at least one processor cause the computing device to perform operations. The operations comprise obtaining a unique identifier associated with at least one tag device, where the at least one tag device includes an antenna and a sensor configured to obtain sensor readings that can be wirelessly transmitted to the computing system via the antenna. The operations also comprise determining, based on the unique identifier, configuration parameters associated with the at least one tag device. The operations further comprise storing, in the at least one memory, at least a portion of the configuration parameters in association with the unique identifier.

In a third aspect, a non-transitory computer readable medium having stored instructions is provided. The instructions are executable by a computing device to cause the computing device to perform functions. The functions include obtaining a unique identifier associated with a tag device, where the tag device includes an antenna and a sensor configured to obtain sensor readings that can be wirelessly transmitted to the computing device via the antenna. The functions also include determining, based on the unique identifier, configuration parameters associated with the tag device. The functions further include storing, in at least one memory, at least a portion of the configuration parameters in association with the unique identifier.

These as well as other aspects, advantages, and alternatives, will become apparent to those of ordinary skill in the art by reading the following detailed description, with reference where appropriate to the accompanying drawings.

DETAILED DESCRIPTION

Figure 1:
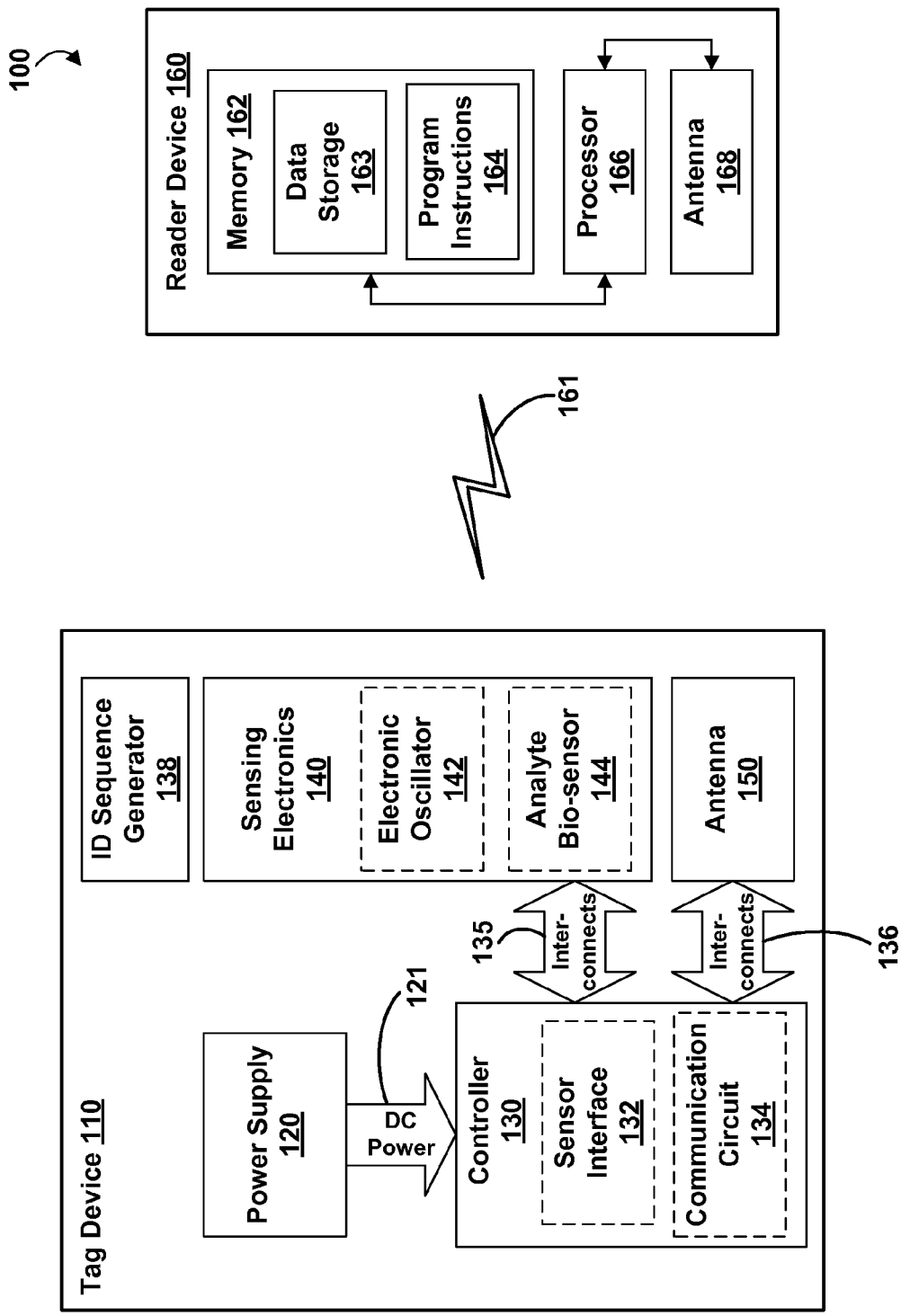
FIG. 1 is a block diagram of a system with a tag device in wireless communication with a reader device, according to an example embodiment.

The following detailed description describes various features and functions of the disclosed systems and methods with reference to the accompanying figures. In the figures, similar symbols typically identify similar components, unless context dictates otherwise. The illustrative method and system embodiments described herein are not meant to be limiting. It will be readily understood that certain aspects of the disclosed methods and systems can be arranged and combined in a wide variety of different configurations, all of which are contemplated herein.

I. Overview

When a tag device is implemented without non-volatile memory, device-specific information, such as calibration information (or other configuration parameters), historical sensor readings (or other user-specific information) can be stored in a reader device or in a database accessible to the reader device. To associate such device-specific information with a particular tag device, the tag device can be configured to generate and output a distinctive signature, such as a substantially unique identification sequence. The identification sequence can be communicated to the reader device, which can then associate a particular tag device with corresponding device-specific information using the substantially unique identification sequence to distinguish between different tag devices. The substantially unique identification sequence can be a data series that can be repeatedly (i.e., consistently) generated by the tag device in response to an interrogation signal. In some cases, the data series is hard-coded into the control electronics of the tag device (e.g., during device manufacture) akin to a serial number. In some cases, the data series is generated dynamically (but substantially repeatably) in accordance with process variations in a series of semiconductive circuit components. For instance, a series of binary bits can be constructed from the output of a set of comparator circuits that each settle in one state or another depending on the difference in threshold voltage between two thin-film transistors.

Configuring the tag device without non-volatile memory, and instead storing device-specific information in the reader device or in a database accessible to the reader device, allows the tag device to operate at a reduced power budget. Historical sensor readings for a particular user can also be loaded to a reader device or database to allow the user to track readings over time, without relying on the resiliency/longevity of any one particular tag device, which may be disposable. In addition, such tag devices can be disposed without losing any user-specific or user-sensitive information (e.g., bio-sensor measurements, temperature measurements, etc.), because such information is stored only on the reader device and/or networked database.

An example method can be implemented by a reader device (and/or by at least one other computing device) to identify one or multiple tag devices that do not have non-volatile memory. The example method can also be implemented to obtain configuration parameters for the identified tag device(s) and/or other information relevant to the identified tag device(s). Such configuration parameters and/or other information can then be transmitted by the reader device to the tag device(s), stored locally at the reader device, and/or stored remotely at another computing device, such as a smartphone.

In an example embodiment, a tag device including at least an antenna and a sensor can be in communication with a reader device that is configured to transmit a signal to the tag device, such as a signal including data to provide to the tag device and/or an interrogation signal to prompt the tag device to transmit information back to the reader device. The reader device can also be in communication with a server, at which configuration parameters for the tag device may be stored. In this embodiment, the reader device may be configured to obtain a (substantially) unique identifier associated with the tag device. The unique identifier may include information associated with where the tag device was fabricated, when it was fabricated, and/or other tag devices that it was fabricated with. Further, the unique identifier may take the form of a substantially unique bit sequence that is generated when the tag device is initially calibrated and configured, such as the substantially unique identification sequence noted above.

The reader device can obtain the unique identifier in various ways. By way of example, the reader device may be configured to scan an optical code associated with the tag device to obtain the unique identifier. The optical code may be a Quick Response (QR) code, and may be presented on packaging for the tag device, for example. The optical code may have encoded the unique identifier of the tag device. Other methods can be used by the reader device to obtain the unique identifier as well. For example, the unique identifier can be embedded or otherwise stored in an RFID-readable device associated with the tag device, such as another tag device. As such, the reader device may be configured to interrogate the RFID-readable device in order to obtain the unique identifier. As a further example, the unique identifier can be obtained from the tag device itself by interrogating the tag device.

After obtaining the unique identifier of the tag device, the reader device may transmit the unique identifier to the server, and responsively receive the configuration parameters from the server based on the unique identifier. The reader device may then store a portion of the configuration parameters in its memory. Further, in some scenarios, the reader device may also transmit another portion of the configuration parameters to the tag device. Upon receiving the configuration parameters, the tag device may be enabled to use the configuration parameters to configure one or more of its components, such as its sensor and/or other circuitry. The tag device's sensor may be configured to obtain sensor readings (e.g., data) that can be wirelessly transmitted by the antenna of the tag device and received by the reader device. Further, the reader device may be configured to use its respective portion of the configuration parameters in accordance with data received from the tag device in order to determine/estimate information about the tag device (e.g., a temperature of the tag device, glucose or other analyte readings obtained by the tag device, etc.).

In another example embodiment, a mobile computing device, such as a smartphone, can be used to obtain the unique identifier. By way of example, the mobile computing device may be configured to scan the optical code (or multiple optical codes, in some scenarios). The mobile computing device may be configured to function as a reader device, or may function as an intermediary between the reader device and the server. The mobile computing device may also be configured to store multiple identifiers and parameters associated with multiple tag devices. For instance, many tag devices may be packaged together and a single optical code may be used to identify them. Upon scanning the signal optical code with the mobile computing device, the mobile computing device may obtain identifiers for each tag device, transmit the identifiers to the server, and responsively receive configuration parameters associated with each tag device. The mobile computing device may transmit some or all of the configuration parameters to the reader device.

II. Example Communication System

FIG. 1 is a block diagram of a system 100 that includes a tag device 110 in wireless communication with a reader device 160. The tag device 110 may include a power supply 120, a controller 130, sensing electronics 140, and a communication antenna 150. The tag device may also include other electronics not shown in FIG. 1. The sensing electronics 140 are operated by the controller 130. The power supply 120 (e.g., a rectifier/regulator component of the power supply 120) supplies and rectifies/regulates operating voltages, such as a DC supply voltage 121, to the controller 130 and/or the sensing electronics 140. The antenna 150 is operated by the controller 130 to communicate information to and/or from the tag device 110.

In some embodiments, the power supply 120 may be coupled to (or include) one or more batteries (not shown). The one or more batteries may be rechargeable and each battery may be recharged via a wired connection between the battery and a power supply 120 and/or via a wireless charging system, such as an inductive charging system that applies an external time-varying magnetic field to an internal battery.

In some embodiments, the power supply 120 may be configured to harvest ambient energy to power the controller 130 and the sensing electronics 140. For example, the power supply 120 may include an RF energy-harvesting antenna configured to capture energy from incident radio radiation provided by the reader device 160. Moreover, the tag device 110 may receive all of its operating energy from an RF signal transmitted by the reader device 160. Additionally or alternatively to the RF energy-harvesting antenna, the power supply 120 may include solar cell(s) ("photovoltaic cells") configured to capture energy from incoming ultraviolet, visible, and/or infrared radiation. Other embodiments are also possible.

The controller 130 is turned on when the DC supply voltage 121 is provided to the controller 130, and the logic in the controller 130 operates the sensing electronics 140 and the antenna 150. The controller 130 can include logic circuitry, such as a sensor interface module 132, configured to operate the sensing electronics 140 so as to interact with a surrounding environment of the tag device 110.

The controller 130 can also include a communication circuit 134 for sending and/or receiving information via the antenna 130. The communication circuit 134 can optionally include one or more oscillators, mixers, frequency injectors, etc. to modulate and/or demodulate information on a carrier frequency to be transmitted and/or received by the antenna 150. In some examples, the tag device 110 is configured to indicate an output from the temperature-sensing electronics 140 by modulating an impedance of the antenna 150 in a manner that is perceivable by the reader device 160. For example, the communication circuit 134 can cause variations in the amplitude, phase, and/or frequency of backscatter radiation from the antenna 150, and such variations can be detected by the reader device 160. In some embodiments, after the reader device 160 transmits an RF signal to the tag device 110, the reader device 160 can receive indications of results from the sensing electronics 140 (e.g., data associated with the electronic oscillator 142, data associated with the analyte bio-sensor 144, and/or other data) transmitted back to the reader device 160 by the backscatter radiation, the backscatter radiation being at a given frequency.

The controller 130 is connected to the sensing electronics 140 via interconnects 135. For example, where the controller 130 includes logic elements implemented in an integrated circuit to form the sensor interface module 132, a patterned conductive material (e.g., gold, platinum, palladium, titanium, copper, aluminum, silver, metals, combinations of these, etc.) can connect a terminal on the chip to the temperature-sensing electronics 140. Similarly, the controller 130 is connected to the antenna 150 via interconnects 136.

It is noted that the block diagram shown in FIG. 1 is described in connection with functional modules for convenience in description. However, embodiments of the tag device 110 can be arranged with one or more of the functional modules ("sub-systems") implemented in a single chip, integrated circuit, and/or physical component. For example, the functional blocks in FIG. 1 shown as the power supply block 120 and controller block 130 need not be implemented as physically separated modules. Moreover, one or more of the functional modules described in FIG. 1 can be implemented by separately packaged chips electrically connected to one another.

The identification sequence generator 138 can be configured to output a unique identifier (e.g., an identification sequence). The unique identifier can be a substantially unique series of values (e.g., a series of binary values) that provide a unique characterizing "fingerprint" for use in distinguishing the tag device 110 from other tag devices. In accordance with the method described herein, the unique identifier may be communicated by the tag device 110 to the reader device 160 to be used by the reader device 160 to retrieve information associated with the tag device 110. A record of the unique identifier may also be stored outside of the system 100 shown in FIG. 1, such as at a server or mobile computing device.

The sensing electronics 140 may include an electronic oscillator 142. The electronic oscillator 142 may include a relaxation oscillator, such as a ring oscillator, or a particular modification of the relaxation oscillator. The electronic oscillator 142 may be utilized, for example, for sensing a temperature of the tag device 110. In other examples, the electronic oscillator 142 can be configured to be sensitive to other parameters, such as light, movement, and humidity, in addition to or alternatively to temperature. As such, the electronic oscillator 142 can be used to estimate parameters not just of the tag device 110, but of the tag device's surrounding environment.

The sensing electronics 140 may also include a frequency divider circuit (not shown), which can be used in accordance with the electronic oscillator 142 and/or other components of the sensing electronics 140, such as the analyte bio-sensor and/or other components not described herein. The frequency divider circuit may include a standard frequency divider configured to generate an output signal at a frequency based on an input signal of a frequency. For example, the tag device 110 may generate an RF signal of a resulting frequency based on the oscillator frequency of the electronic oscillator 142. In some embodiments, the frequency divider circuit of the tag device 110 may be a component of a frequency synthesizer system configured to generate any resulting frequency that is within a given range of frequencies (e.g., within an optimal range of frequencies for the tag device 110 to operate at). The given range may be based on the type of tag device (e.g., high-frequency RFID tag or ultra-high-frequency RFID tag). The resulting frequency may be generated from a single oscillator, such as the electronic oscillator 142. Further, the resulting frequency can be generated by the frequency synthesizer system based on frequency multiplication, frequency division, and/or frequency mixing. In some embodiments, the sensing electronics 140 may include a frequency adjuster component other than a frequency divider circuit, which may use a type of frequency adjustment factor to adjust/correct the oscillator frequency.

The sensing electronics 140 may include an analyte bio-sensor 144. The analyte bio-sensor 144 can be, for example, an amperometric electrochemical sensor that includes a working electrode and a reference electrode. A voltage can be applied between the working and reference electrodes to cause an analyte (e.g., glucose) to undergo an electrochemical reaction (e.g., a reduction and/or oxidation reaction) at the working electrode. The electrochemical reaction can generate an amperometric current that can be measured through the working electrode. The amperometric current can be dependent on the analyte concentration. Thus, the amount of the amperometric current that is measured through the working electrode can provide an indication of analyte concentration. In some embodiments, the sensor interface module 144 can be a potentiostat configured to apply a voltage difference between working and reference electrodes while measuring a current through the working electrode.

It should be understood that components of the sensing electronics 140 described above may have other functionalities related to the operation of the tag device 110 other than sensing parameters of the tag device's environment, and thus the description of their functions should not be limited to the description herein.

The reader device 160 includes an antenna 168 (or a group of more than one antennae) to send and receive wireless signals, such as RF signals, to and from the tag device 110. The reader device reader 160 also includes a computing system with a processor 166 in communication with a memory 162. The memory 162 is a non-transitory computer-readable medium that can include, without limitation, magnetic disks, optical disks, organic memory, and/or any other volatile (e.g. RAM) or non-volatile (e.g. ROM) storage system readable by the processor 166. The memory 162 can include a data storage 163 to store indications of data, such as sensor readings, program settings (e.g., to adjust behavior of the tag device 110 and/or the reader device 160), etc. The memory 162 can also include program instructions 164 for execution by the processor 166 to cause the reader device 160 to perform processes specified by the instructions 164. For example, the program instructions 164 can cause the reader device 160 to provide a user interface that allows for retrieving information communicated from the tag device 110 (e.g., outputs from the sensing electronics 140). The reader device 160 can also include one or more hardware components for operating the antenna 168 to send and receive the wireless signals to and from the tag device 110. For example, oscillators, frequency injectors, encoders, decoders, amplifiers, filters, etc. can drive the antenna 168 according to instructions from the processor 166.

The reader device 160 can be a smart phone, digital assistant, or other portable computing device with wireless connectivity sufficient to provide the wireless communication link 161. The reader device 160 can also be implemented as an antenna module that can be plugged in to a portable computing device, such as in an example where the communication link 161 operates at carrier frequencies not commonly employed in portable computing devices. In some embodiments, the tag device 110 may be implemented in an eye-mountable device (e.g., a contact lens) so as to sense a temperature of the eye-mountable device. In such embodiments, the reader device 160 may be configured to be worn relatively near a wearer's eye to allow the wireless communication link 161 to operate with a low power budget. For example, the reader device 160 can be integrated in eyeglasses, jewelry, or integrated in an article of clothing worn near the head, such as a hat, headband, etc.

In some embodiments, the tag device 110 and reader device 160 include one or more wireless interfaces so as to communicate with each other using a radio-frequency ID (RFID) protocol. For example, the tag device 110 and reader device 160 can communicate with each other in accordance with a Gen2 ultra-high frequency (UHF) RFID protocol, under which the system 100 operates in a frequency range of 860 MHz to 960 MHz. Further, under the Gen2 UHF RFID protocol, the system 100 may be a passive-backscatter system in which the reader device 160 transmits information to the tag device 110 by modulating an RF signal in the 860 MHz to 960 MHz frequency range. Still further, the passive tag device 110 can receive its operating energy from the RF signal, as noted above, and can modulate the reflection coefficient of its antenna in order to backscatter a signal to the reader device 160 (after being directed to do so by the reader device 160, e.g., an "interrogator-talks-first" system). Other RFID protocols are also possible.

In some embodiments, the system 100 can operate to non-continuously ("intermittently") supply energy to the tag device 110 to power the controller 130 and sensing electronics 140 (e.g., a passive system). For example, RF radiation can be supplied to power the tag device 110 long enough to carry out a sensor reading and communicate the results. Further, the supplied RF radiation can be considered an interrogation signal from the reader device 160 to the tag device 110 to request a sensor reading or other information to be acquired and sent back to the reader device 160. By periodically interrogating the tag device 110 (e.g., by supplying RF radiation 161 to temporarily turn the device on) and storing the sensor results (e.g., via the data storage 163), the reader device 160 can accumulate a set of data/measurements over time without continuously powering the tag device 110.

III. Example Methods and Scenarios

Figure 2:
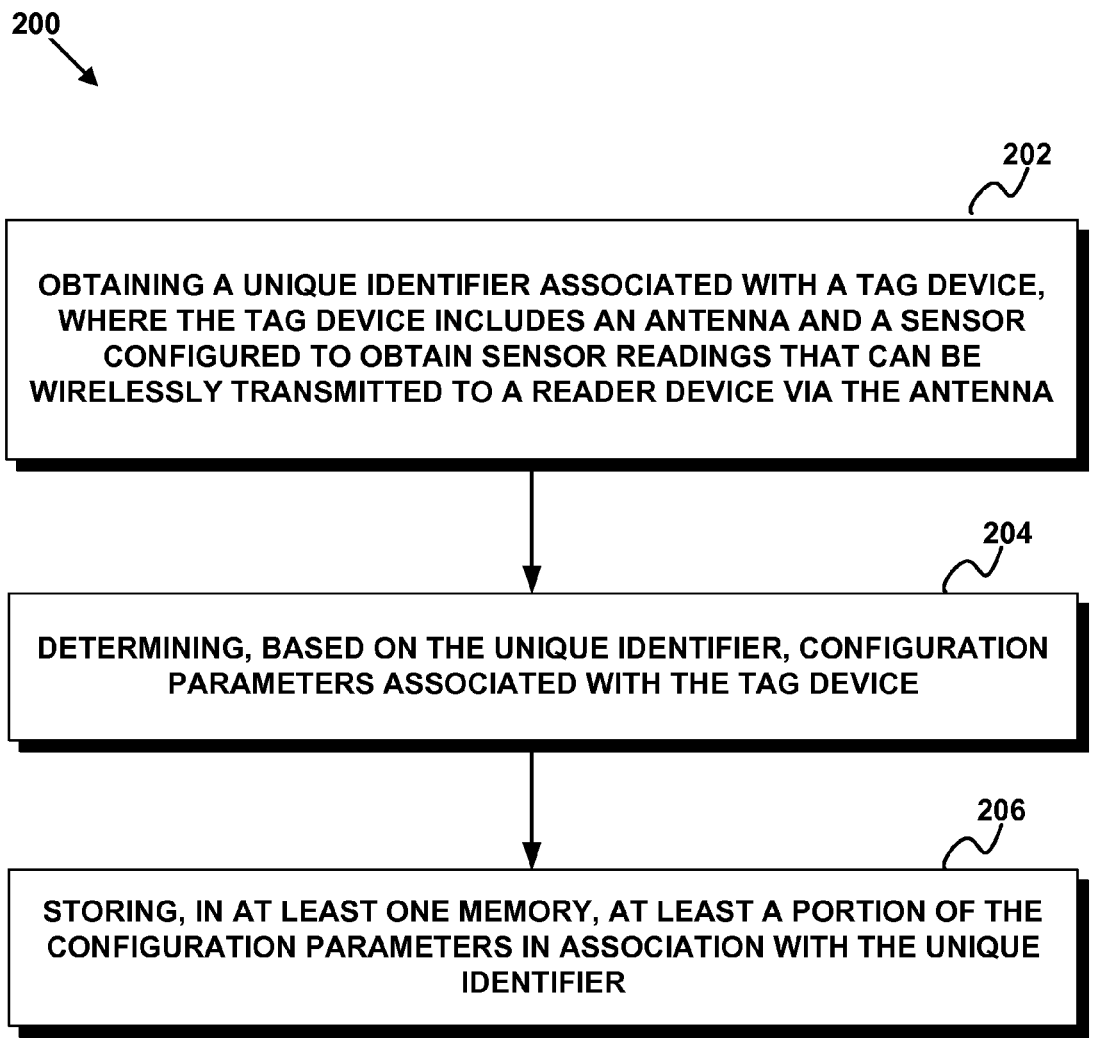
FIG. 2 is a flow chart illustrating an example method according to an example embodiment.

FIG. 2 is a flow chart illustrating an example method 200 according to an example embodiment. The example method 200 will be described hereafter in conjunction with FIG. 3A, which illustrates an example system 300 configured to implement the example method 200. Although the example method 200 is described below as carried out by a reader device, it should be understood that the example method 200 can be carried out, additionally or alternatively, by one or more other devices as well, such as a mobile computing device, a wearable computing device, and any aforementioned devices.

At step 202, the reader device 302 obtains a unique identifier associated with a tag device 306. The tag device 306, such as a RFID tag, may include an antenna and a sensor configured to obtain sensor readings that can be wirelessly transmitted to the reader device 302 via the antenna. The unique identifier for a particular tag device may be a unique identifier that was determined during an initial "factory-level" calibration and configuration of the particular tag device (e.g., initial sensor calibration, setting initial oscillator tuning levels, etc.). Alternatively, the unique identifier may have been determined at another point in time, or may be determined during the process of obtaining it (e.g., the reader device interrogates the tag device or other tag device that provides or determines the unique identifier).

As noted above, the unique identifier can be obtained in various ways. It should be understood that while the example method 200 is described herein in conjunction with the example system 300 of FIG. 3, in which the unique identifier is obtained by scanning an optical code 304, the unique identifier may be obtained in other ways including, but not limited to, those described above.

With respect to the example system 300, the reader device 302 may scan an optical code 304, such as a Quick Response (QR) code or other machine-readable code, associated with a tag device 306 (or multiple tag devices) in order to obtain the unique identifier. The optical code 304 may encode the unique identifier. The scanning of the optical code 304 can also be performed by a computing device 308, such as a smartphone, laptop computer, tablet computer, desktop computer, etc., that is in wired and/or wireless communication with the reader device 302 and/or with a server 310 at which information associated with the tag device(s) 306 may be stored (e.g., a web server). As noted above, other types of computing devices, such as a wearable computing device, can also be configured to obtain the unique identifier (and/or perform any other functions described herein).

In some embodiments, additional information associated with the tag device(s) 306 may be included with the unique identifier (or remotely from the unique identifier) and may be obtained as well by at least the same means as the reader device 302 obtains the unique identifier. For example, the optical code 304 may also encode the additional information. The additional information may take the form of a header, and may include manufacture information of the tag device(s) 306, such as at least one timestamp indicating when the tag device(s) were manufactured, calibrated, and/or shipped (e.g., production date, calibration date, shipment date, etc.). The manufacture information may also include a lot number representative of a group of tag devices that a particular tag device was manufactured with. Other information can also be included as part of the additional information, such as a particular tag device's expiration date. Additionally or alternatively to being encoded in the optical code 304, it is possible for some or all additional information to be included on the tag device 306 itself, via masking and/or other methods, or included on/at another device.

The unique identifier and additional information can be hard coded to the optical code 304, and the optical code 304 may be included on a packaging of the tag device(s) 306. In an example embodiment, an individual tag device may include a respective optical code included on packaging for the individual tag device. In such an embodiment, a larger packaging can be used for multiple tag devices, each tag device with its own optical code. Additionally or alternatively, in another example embodiment, the larger packaging may include an optical code that encodes information for each tag device contained in the larger packaging (e.g., one optical code associated with every tag device in the packaging rather than multiple optical codes, each associated with a particular tag device in the packaging). In such other embodiments, the optical code may encode the unique identifiers of each tag device contained in the larger packaging.

At step 204, the reader device 302 (and/or the computing device 308, in some examples) determines, based on the scanned optical code 304, the unique identifier and configuration parameters associated with the tag device 306 (or tag devices, if the optical code encodes multiple unique identifiers for multiple tag devices). When the reader device 302 scans the optical code 304, it may retrieve the unique identifier of the tag device 306 encoded in the optical code 304. The reader device 302 may then transmit the unique identifier to the server 310 and/or other such database(s) which may be utilized to look up the configuration parameters associated with the tag device 306. The reader device 302 may then receive the configuration parameters from the server.

For tag devices equipped with electrochemical bio-sensors, temperature sensors, and other sensors, the configuration parameters may include sensor calibration information associated with the tag device's sensor or other components of the tag device 306. In other embodiments, the configuration parameters may also include calibration information associated with one or more components of the reader device 302 and/or the computing device 308. The calibration information may relate to interpreting results from the tag device 306. For example, the calibration information may be used by the reader device 302 in interpreting the sensor readings as indications of analyte levels (e.g., mapping sensor readings to analyte concentrations), as indications of temperature, or as indications of other parameters. The calibration information may be based on a manufacturing batch of a particular tag device (e.g., lot number). Additionally or alternatively, calibration information may be based on previously obtained calibration results for a particular tag device. The configuration parameters may additionally or alternatively include sensor configuration information and/or user preferences for operating the sensor (e.g., voltage offset settings, sensor stabilization durations, measurement frequencies, etc.). Such configuration information can then be used to cause the tag device 306 to obtain measurements in accordance with the configuration information. For example, an indication of sensor stabilization time can cause the reader to initiate a stabilization operation prior to obtaining a sensor measurement with a duration specified in the configuration information.

In addition to the sensor calibration information, other tag device-specific information can be stored at the server 310 (and/or other databases). Such other tag device-specific information may include device manufacture information (e.g., lot number identification, production date, shipment date, expiration date, serial number, etc.), associated user information (e.g., user identity, user configuration/profile information, such as number or frequency of measurements to perform for the particular user, predetermined alert levels, etc.), and/or device usage history (e.g., historical sensor measurements, time since last usage, time since last calibration, etc.). Other examples of tag device-specific information are also possible as the examples provided herein are generally included by way of example and not limitation. It should be understood, however, that while tag device-specific information can include user-specific information, such user-specific information may not be tethered to the identity of individual users of the tag device(s). Further, users of the tag device(s) can elect not to participate in collection of such user-specific information.

In some embodiments, at least a portion of the configuration parameters, such as calibration information associated with at least one tag device 306, can be encoded in the optical code 304 on a packaging of the at least one tag device 306. In such embodiments, the computing device 308 (or reader device 302, in similar embodiments) can scan the optical code 304 and subsequently download some or all of the aforementioned configuration parameters of the tag device(s) 306 (including at least a unique identifier for each tag device) so as to temporarily or permanently store the configuration parameters in a database at the computing device 308 and/or at other devices. By doing so, the computing device 308 can refer to its own database instead of having to scan the optical code 304 more than an initial scan and communicate with the server 310 every time configuration information is desired. The configuration parameters, including calibration information for the tag device(s) 306, may be stored in a database.

At step 206, the reader device 302 (and/or the computing device 308, in some examples) stores, in at least one memory, at least a portion of the configuration parameters in associated with the unique identifier. The at least one memory can be included in one or more of the reader device 302, the computing device 308, and other computing device(s) in communication with the devices of the system 300 illustrated in FIG. 3A.

The portion of the configuration parameters may include, for example, calibration information associated with the sensor of the tag device 306, such that measured values can be determined based on the sensor readings and the calibration information. In some scenarios, the reader device 302 can use an RF signal to prompt the tag device 306 to obtain a sensor reading. The tag device 306 may then transmit, via backscatter radiation, data representative of the sensor reading, data representative of the tag device's unique identifier, and possibly other information. Upon receiving the sensor reading, the reader device 302 may then retrieve, from the at least one memory, the calibration information (e.g., calibration curves) and other relevant information of the first portion of the configuration parameters based on the unique identifier. The reader device 302 can also retrieve the calibration information using header data associated with the tag device 306, such as the tag device's lot number, production date, etc., as noted above. The reader device 302 can then determine a measured value based on the sensor reading and the first portion of the configuration parameters (e.g., compare the sensor reading to data points of the calibration curve to estimate/determine the measured value).

In some embodiments, upon receiving the unique identifier from the tag device 306 (the unique identifier being substantially unique due to reasons described below with respect to FIG. 3B), the reader device 302 may refer to a database of tag-device specific information that was stored in its memory after obtaining the unique identifier (e.g., scanning the optical code) in order to verify the identity of the tag device 306 (or a user of the tag device). Alternatively, the reader device 302 may query the computing device 308 and/or the server 310 in order to refer to the database. The reader device 302 may then check the database to determine which unique identifier in the database is closest to or identical to the unique identifier received from the tag device 306. It should be understood that while the tag device 306 may be configured to communicate its unique identifier in response to an interrogation signal from the reader device 302, the reader device 302 may not need to use the unique identifier received from the tag device 306 in some scenarios, and may instead refer to a unique identifier associated with the tag device 306 that is already stored in memory responsive to the obtaining of the unique identifier by the reader device 302 and/or other devices.

In some embodiments, in addition to storing the portion (i.e., a first portion) of the configuration parameters at the reader device 302 and/or other device(s), the reader device 302 (and/or the computing device 308, in some examples) communicates at least another portion (i.e., a second portion)

of the configuration parameters to the tag device 306. In examples where the computing device 308 performs the obtaining described at step 202, the computing device 308 may subsequently download from a server 110 a first portion of the configuration parameters associated with a particular tag device to store either locally at the computing device 308 or remotely at the reader device 302. The computing device 308 may also download a second portion of the configuration parameters of the particular tag device and communicate the second portion to the particular tag device.

The second portion of the configuration parameters may relate to parameters that can be utilized for configuring at least one component of the tag device, such as an electronic oscillator of the tag device (e.g., a ring oscillator), an analyte bio-sensor of the tag device, an RF transceiver, a voltage reference, a current reference, and/or other circuitry/components. As such, the tag device 306 can be configured to provide a sensor reading to the reader device 302 after receiving an interrogation signal from the reader device 302. The reader device 302 can then interpret the sensor reading using the first portion of configuration parameters, such as calibration information associated with the tag device 306.

In an example scenario of the reader device interpreting a sensor reading using calibration information, the reader device may obtain a sensor reading from the tag device, such as an eye-mountable device (e.g., a tag device embedded in a contact lens) equipped with an electronic oscillator. For instance, the reader device can transmit RF radiation to the eye-mountable device, the eye-mountable can then perform a measurement and modulate backscatter radiation to indicate the measured frequency of the electronic oscillator, and the reader device can receive the indication of the measurement. The RF radiation may indicate a reference frequency or other information as well that may be needed in order to enable the eye-mountable device to perform the measurement. The reader device can then use calibration information included in the first portion of configuration parameters retrieved from a database and stored at the reader device to estimate/determine a temperature of the eye-mountable device corresponding to the received measured oscillator frequency. To do so, the first portion of configuration parameters may include a calibration curve relating the oscillator frequency of the eye-mountable device and a temperature of the eye-mountable device. Other types of calibration curves and calibration information are possible, and other example scenarios are possible as well.

Figure 3A:
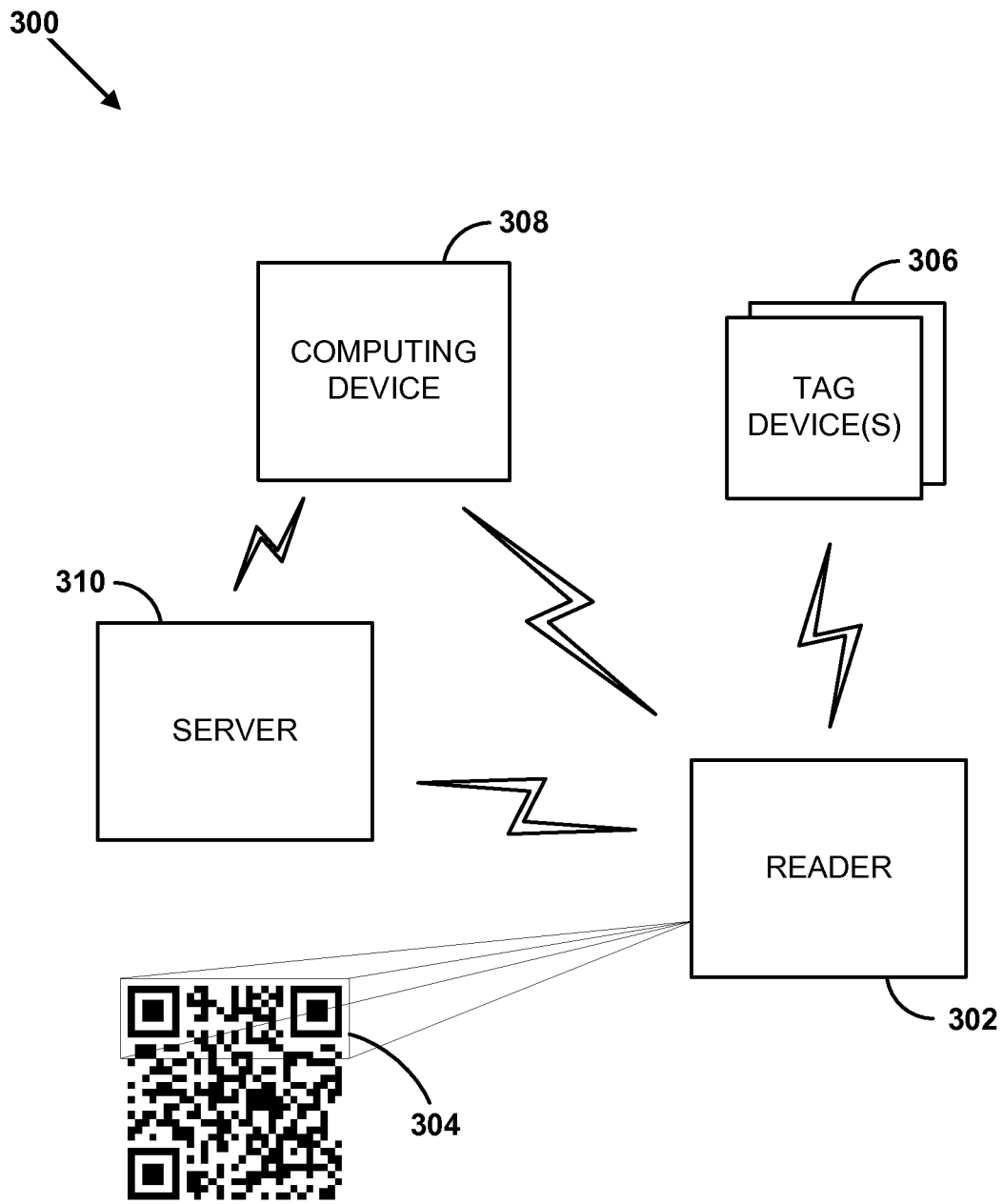
FIGS. 3A-3B are block diagrams of an example system configured to implement the example method, according to an example embodiment.
Figure 3B:
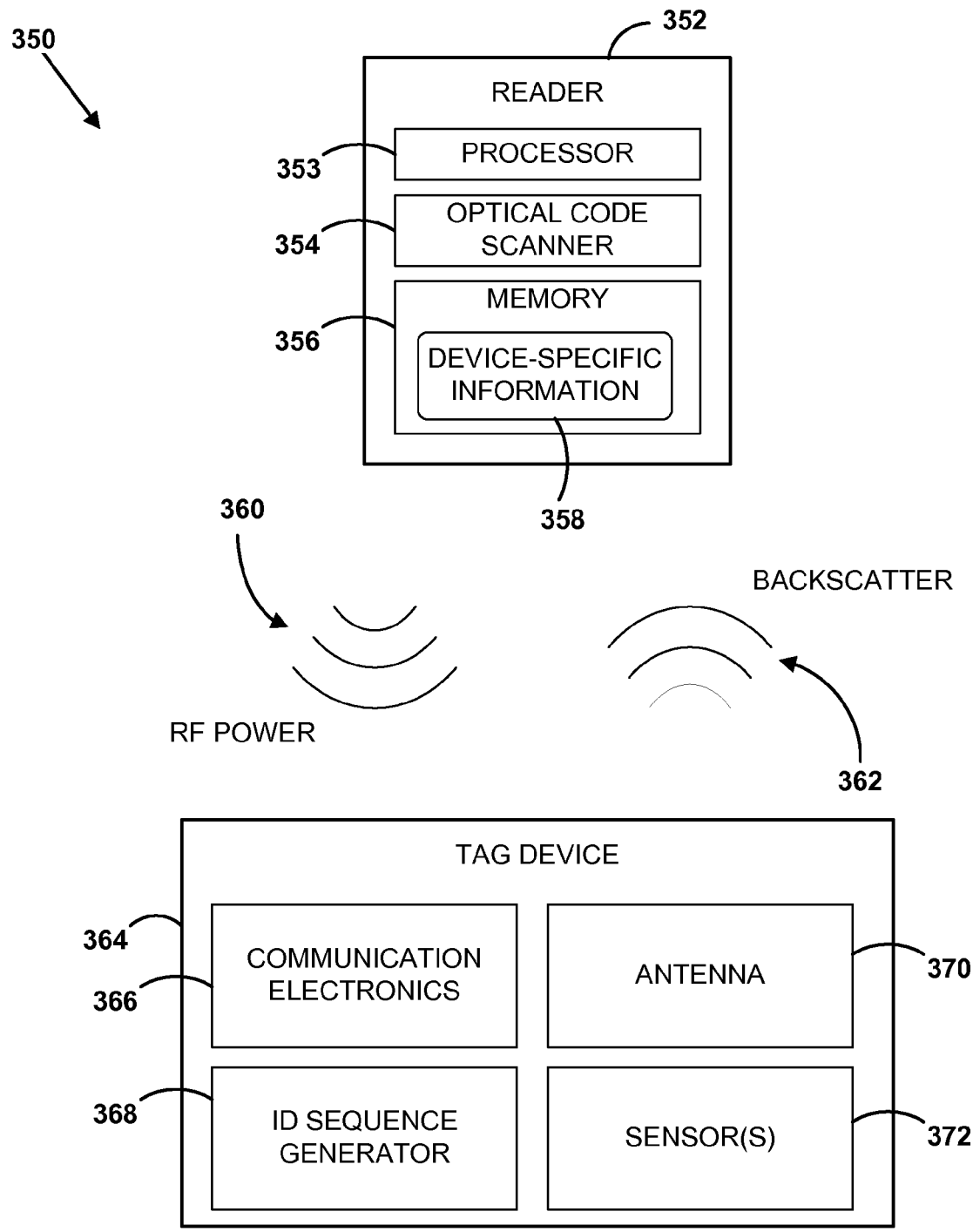

FIG. 3B is a detailed block diagram of a system 350 with tag device 364 in communication with a reader device 352, similar to the tag devices 110, 306 and reader devices 160, 302 of FIGS. 1 and 3A. The tag device 364 can operate to output a unique identifier (e.g., a substantially unique identification sequence) and communicate the unique identifier to the reader device 352. Using the unique identifier, the reader device 352 can then retrieve and/or store data specific to the particular tag device 364, such as configuration and/or calibration information. The reader device 352 can differentiate between different tag devices, using the unique identifiers from each, and associate tag device-specific data with each device. As such, the tag device 364 does not have any need for non-volatile memory to store data. Instead, the reader device 352 (or a database accessible by the reader device 352, such as a database at a mobile computing device and/or server) can store tag device-specific information in a manner that associates the stored information with the unique identifiers of the tag device 364.

The reader device 352 includes a processing system 353, an optical code scanner 354 for scanning machine-readable code, and a memory 356. The memory 356 can be a volatile and/or non-volatile computer readable media located in the reader device 352 and/or in network communication with the reader device 352. The memory 356 can be similar to, for example, the memory 162 in the reader device 160 discussed with regard to FIG. 1 above. The processing system 353 can be a computing system that executes software stored in the memory 356 to cause the system 350 to operate as described herein. The reader device 352 may be incorporated into a wearable device, such as a device configured to be worn relatively near a user's eye, such as a hat, a headband, an earring, a pendant, eye glasses, etc. The reader device 352 may also be incorporated into a watch, a mobile phone, or another personal electronics device.

In some examples, the reader device 352 may obtain one or more measurements from sensor(s) on the tag device 364 (e.g., by intermittently transmitting a measurement signal to cause an electrochemical sensor included in the tag device 364 to obtain a measurement and communicate the results). The reader device 352 can also include an antenna (not shown) (e.g., an RF transceiver unit) for transmitting RF radiation 360 to be harvested by the tag device 364. The reader device 352 can also receive information transmitted back to the reader by backscatter radiation 362. For example, the antenna impedance of the tag device 364 can be modulated in accordance with a unique identifier such that the backscatter radiation 362 indicates the unique identifier. The backscatter radiation 362 may also indicate sensor measurements and oscillator frequency readings, among other examples. The reader device 352 can also use the memory 356 to store indications of tag device-specific information 358 (e.g., amperometric current measurements) communicated from the tag device 364. The reader device 352 can also use the memory 356 to store other tag device-specific information 358 (e.g., calibration information) received from a mobile device, server, or other computing device after scanning an optical code associated with the tag device 364.

The tag device 364 can include communication electronics 366, an identification sequence generator 368, an antenna 370, and at least one sensor 372 (which may include components found in the sensing electronics 140 of the tag device 110 illustrated in FIG. 1). As noted above with respect to FIG. 1, the identification sequence generator 368 can be configured to output a unique identifier (e.g., an identification sequence). The unique identifier can be a substantially unique series of values (e.g., a series of binary values) that provide a unique characterizing "fingerprint" for use in distinguishing the particular tag device 364 from others. The sequence generator 368 can be configured to repeatably (e.g., consistently) output the series in response to a prompt, such that the same particular device 364 can be consistently associated with the same unique identifier. For example, the identification sequence generator 368 can be a circuit that receives a prompt and outputs the unique identifier. The identification sequence generator 368 may be a circuit that is incorporated into a control chip of the tag device 364. In some examples, the unique identifier can be a serial number that is imprinted into the tag device 364 during a manufacturing process. For example, a circuit implementation of the identification sequence generator 368 can be customized, during manufacture, to output a substantially unique series of high/low values. Each ophthalmic device that is produced can then be assigned a different unique identifier, and the identification sequence generator circuits of each can be customized accordingly.

Additionally or alternatively, the identification sequence generator 368 can be configured to generate the unique identifier for the tag device 364 based on process variations in one or more circuit components. For example, a comparator circuit can be created that compares threshold voltages of two different transistors (or sets of transistors). The uncorrelated threshold voltage variations in such pairs can be amplified and digitized to create a sequence of binary values depending on the state of each comparator circuit. The individual binary state comparator circuits can each be formed from a comparator circuit (e.g., a latch circuit) with cross-coupled logic gates. Following a reset, each comparator circuit settles on one of two possible states depending on the random offset between the threshold voltages. Positive feedback in the cross-coupled arrangement amplifies the small variations to allow for readout. An array of many such circuits can then be used to create a unique identifier: an identification sequence with a desired number of bits. Because the resulting identification sequence is based on random, uncorrelated variations in transistor threshold voltage (or other process variations in the die, etc.), the identification sequence may not be entirely unique (i.e., two different identification circuits may generate identical identification sequences). Moreover, such an identification sequence generator 368 that relies on random process variations may not consistently settle on the same output sequence. For example, comparisons between particularly close threshold voltages may not consistently settle on the same value, and some circuits may systematically change their output over time due to differential degradation of the compared circuit components. However, the probability of such ambiguities can be mitigated by using identification sequences with relatively greater word length (e.g., a greater number of bits, such as 128 bits).

In an example, the identification sequence generator 368 can include multiple state circuits that are each configured to settle in one of multiple possible states, and each state circuit can then represent a bit (or multiple bits) in the substantially unique identification sequence. An example of such a state circuit can include a cross-coupled NOR gate. A pair of transistors can be arranged to cause the circuit to settle in one state or another depending on the difference in threshold voltage between the two. Each transistor has a gate terminal, a source terminal, and a drain terminal. The conductivity between the drain and source terminals is determined in part by the voltage applied across the gate and source terminals, with a gate-source voltage $V_{gs}$ exceeding a threshold $V_{th}$ resulting in a non-zero drain-source current $I_{ds}$. The pair of transistors can be connected with the gate of the first transistor connected to the source of the second transistor and the gate of the second transistor connected to the source of the first transistor. The drain of each transistor can be connected to a supply line and the source of each transistor can be connected to a ground line. The respective connections to the supply line and the ground line can each be made through a transistor driven by a reset line. Upon resetting the circuit the source terminals and cross-coupled gate terminals are all set low (e.g., set to ground).

During the reset to low voltage one of the two cross-coupled transistors becomes conductive before the other one (e.g., the one with the lower threshold voltage). Current through the transistor that becomes conductive first creates positive feedback to increase the gate-source voltage of the first conductive transistor while decreasing the conductivity of the second transistor, via the cross-coupled drain/gate connection. The drains of the two cross-coupled transistors then settle with one at a high voltage and one at a low voltage, depending on which of the two transistors has a higher threshold voltage. Because the threshold voltage $V_{th}$ is a function of variations in the physical properties of the transistor channel regions (e.g., charge carrier mobility, channel width and length, oxide conductance, etc.), either of the two states occur with roughly equal probability in a given cell due to uncorrelated process variations in the manufacture of the circuit. The drains of the two transistors (or one of them) thus represents an output state of the example state circuit that settles in one of multiple possible states based on random process variations in the manufacture of the state circuit. Other state circuits based on process variations in physical features in the constructed circuitry can also be employed; the above state circuit is described for example purposes only.

In some embodiments, upon receipt of backscatter radiation 362 indicative of the unique identifier of the tag device 364 and a sensor reading obtained by the sensor(s) 372, the reader device 352 can use the unique identifier of the tag device 364 to access tag device-specific information 358 in the memory 356. For example, the reader device 352 may lookup configuration parameters (e.g., calibration information, such as calibration curves) for the tag device 364, a date of manufacture, production batch, shipment date, or expiration date of the tag device 364, any information regarding prior use of the tag device 364, an particular user associated with the tag device 364, etc. Such tag device-specific information 358 may be previously loaded to the memory 356 in connection with manufacture, calibration, testing, or prior use(s) of the device 364, for example. In addition, the reader device 352 may supplement such tag device-specific information 358 with additional sensor readings, user preferences, etc., such that the additional information is associated with the unique identifier that identifies the particular tag device 364. Additionally or alternatively, the reader device 352 may access tag device-specific information stored non-locally (e.g., a database stored on a server in communication with the reader device 352 or a database stored in memory on a smartphone in communication with the reader device 352).

Once accessed, the tag device-specific information 358 can then be used by the reader device 352 to operate the tag device 364. For example, the reader device 352 may use configuration parameters and other data included in the tag device-specific information 358 to determine how often (or under what conditions) to query the tag device 364 for readings. In some embodiments, the configuration parameters may specify a desired amperometric current stabilization time for the electrochemical sensor 372, and the reader device 352 may therefore be configured to instruct the tag device 364 to first apply a voltage across electrodes in the sensor 372 for a period while the amperometric current stabilizes (e.g., as the electrochemical reactions at the working electrode reach a steady state). Following the stabilization time, the reader device 352 can then prompt the tag device 364 to measure the amperometric current and indicate the measured current via the backscatter radiation 362. Other tag device-specific operation preferences are also possible. Additionally or alternatively, the reader device 352 may use calibration information to interpret sensor readings (i.e., amperometric current measurements). Such calibration information may include, for example, a sensitivity and/or offset to define a calibration curve that relates current measurements to analyte concentrations, a calibration curve that relates an oscillator frequency of the tag device 364 to temperature, a calibration curve that relates current supplied to the tag device 364 to temperature, among other calibration information.

By storing tag device-specific information 358 off of the tag device 364, and mapping such information to the tag device 364 using the (substantially) unique identifier output from the identification sequence generator 368, the tag device 364 does not require on-board programmable memory. As such, the memory-free tag device 364 does not store any user-specific information (e.g., prior sensor readings, etc.).

Such a memory-free configuration thereby alleviates potential privacy concerns because user-specific information is stored on a platform suitable for incorporating data-protection routines, such as credentialed logins, encryption schemes, etc., which platform may be any combination of the reader device 352, a mobile computing device that is in communication with the reader device 352, and/or other external servers/devices. Moreover, the memory-free configuration alleviates concerns over losing data stored in the tag device 364 in the event of losing the tag device 364. As such, the memory-free configuration described herein facilitates implementations in which the tag device 364 may be a disposable product, similar to a disposable contact lens employed in vision correction applications.

IV. Embedding a Tag Device in a Contact Lens

A tag device, such as an RFID tag, can be embedded in a body-mountable device, such as an eye-mountable device, which may be worn on the eye as a contact lens. Further, the tag device may be in RF communication with a reader device so as to enable the reader device to receive data and other information from the tag device and/or eye-mountable device.

Figure 4A:
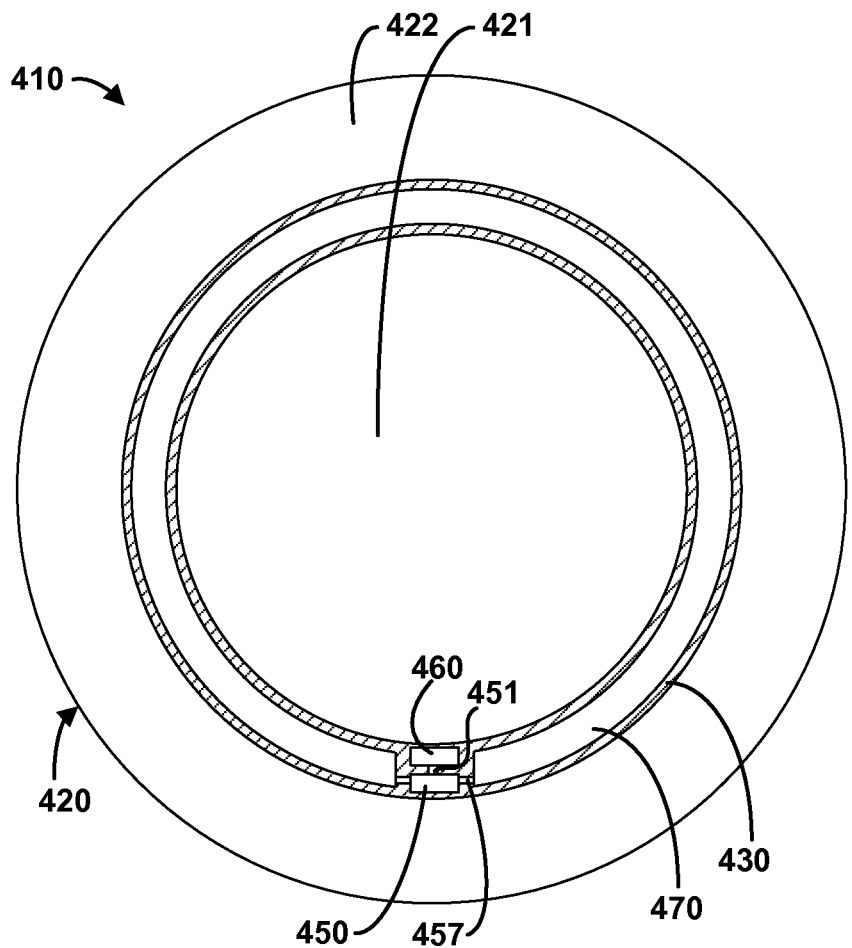
FIGS. 4A-4B are views of an example eye-mountable device, according to an example embodiment.
Figure 4B:
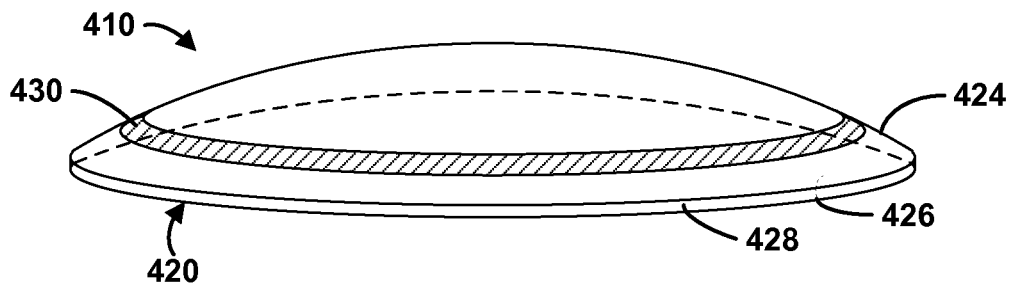

FIG. 4A is a bottom view of an example eye-mountable device 410 (or ophthalmic electronics platform), and FIG. 4B is a side view of the example eye-mountable device 410. It is noted that relative dimensions in FIGS. 4A and 4B are not necessarily to scale, but have been rendered for purposes of explanation only in describing the arrangement of the example eye-mountable device 410.

The eye-mountable device 410 is formed of a polymeric material 420 shaped as a curved disk. The polymeric material 420 can be a substantially transparent material to allow incident light to be transmitted to the eye while the eye-mountable device 410 is mounted to the eye. The polymeric material 420 can be a biocompatible material similar to those employed to form vision correction and/or cosmetic contact lenses in optometry, such as polyethylene terephthalate ("PET"), polymethyl methacrylate ("PMMA"), polyhydroxyethylmethacrylate ("polyHEMA"), silicone hydrogels, combinations of these, etc. The polymeric material 420 can be formed with one side having a concave surface 426 suitable to fit over a corneal surface of an eye. The opposite side of the disk can have a convex surface 424 that does not interfere with eyelid motion while the eye-mountable device 410 is mounted to the eye. A circular outer side edge 428 connects the concave surface 424 and convex surface 426.

The eye-mountable device 410 can have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of the eye-mountable device 410 can be selected according to the size and/or shape of the corneal surface of the wearer's eye.

The polymeric material 420 can be formed with a curved shape in a variety of ways. For example, techniques similar to those employed to form vision-correction contact lenses, such as heat molding, injection molding, spin casting, etc. can be employed to form the polymeric material 420. While the eye-mountable device 410 is mounted in an eye, the convex surface 424 faces outward to the ambient environment while the concave surface 426 faces inward, toward the corneal surface. The convex surface 424 can therefore be considered an outer, top surface of the eye-mountable device 410 whereas the concave surface 426 can be considered an inner, bottom surface. The "bottom" view shown in FIG. 4A is facing the concave surface 426. From the bottom view shown in FIG. 4A, the outer periphery 422, near the outer circumference of the curved disk is curved to extend out of the page, whereas the central region 421, near the center of the disk is curved to extend into the page.

A substrate 430 is embedded in the polymeric material 420. The substrate 430 can be embedded to be situated along the outer periphery 422 of the polymeric material 420, away from the central region 421. The substrate 430 does not interfere with vision because it is too close to the eye to be in focus and is positioned away from the central region 421 where incident light is transmitted to the eye-sensing portions of the eye. Moreover, the substrate 430 can be formed of a transparent material to further mitigate effects on visual perception.

The substrate 430 can be shaped as a flat, circular ring (e.g., a disk with a centered hole). The flat surface of the substrate 430 (e.g., along the radial width) is a platform for mounting electronics such as chips (e.g., via flip-chip mounting) and for patterning conductive materials (e.g., via microfabrication techniques such as photolithography, deposition, plating, etc.) to form electrodes, antenna(e), and/or interconnections. The substrate 430 and the polymeric material 420 can be approximately cylindrically symmetric about a common central axis. The substrate 430 can have, for example, a diameter of about 10 millimeters, a radial width of about 1 millimeter (e.g., an outer radius 1 millimeter greater than an inner radius), and a thickness of about 50 micrometers. However, these dimensions are provided for example purposes only, and in no way limit the present disclosure. The substrate 430 can be implemented in a variety of different form factors.

In some examples, the substrate 430 may include a tag device. As such, components of the tag device may also be disposed on the embedded substrate 530. For instance, a loop antenna 470, a controller 450, and sensing electronics 460 (e.g., an electronic oscillator, analyte bio-sensor, etc.), such as those described with respect to FIG. 1, can be disposed on the embedded substrate 430. The controller 450 can be a chip including logic elements configured to operate the sensing electronics 460 and the loop antenna 470. The controller 450 is electrically connected to the loop antenna 470 by interconnects 457 also situated on the substrate 430. Similarly, the controller 450 is electrically connected to the sensing electronics 460 by an interconnect 451. The interconnects 451, 457, the loop antenna 470, as well as other components can be formed from conductive materials patterned on the substrate 430 by a process for precisely patterning such materials, such as deposition, photolithography, etc. The conductive materials patterned on the substrate 430 can be, for example, gold, platinum, palladium, titanium, carbon, aluminum, copper, silver, silver-chloride, conductors formed from noble materials, metals, combinations of these, etc. The controller 450 and sensing electronics 560 can also be implemented as a single chip, rather than two separate connected components.

As shown in FIG. 4A, which is a view facing the concave surface 426 of the eye-mountable device 410, the sensing electronics 460 are mounted to a side of the substrate 430 facing the concave surface 526. In general, any electronics, electrodes, etc. situated on the substrate 430 can be mounted to either the "inward" facing side (e.g., situated closest to the concave surface 426) or the "outward" facing side (e.g., situated closest to the convex surface 424). Moreover, in some embodiments, some electronic components can be mounted on one side of the substrate 430, while other electronic components are mounted to the opposing side, and connections between the two can be made through conductive materials passing through the substrate 430.

The loop antenna 470 is a layer of conductive material patterned along the flat surface of the substrate to form a flat conductive ring. In some instances, the loop antenna 470 can be formed without making a complete loop. For instances, the loop antenna 470 can have a cutout to allow room for the controller 450 and sensing electronics 460, as illustrated in FIG. 4A. However, the loop antenna 470 can also be arranged as a continuous strip of conductive material that wraps entirely around the flat surface of the substrate 430 one or more times. For example, a strip of conductive material with multiple windings can be patterned on the side of the substrate 430 opposite the controller 450 and sensing electronics 460. Interconnects between the ends of such a wound antenna (e.g., the antenna leads) can then be passed through the substrate 430 to the controller 450.

V. Conclusion

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
    obtaining a unique identifier associated with a tag device, wherein the tag device includes an antenna and a sensor configured to obtain sensor readings that can be wirelessly transmitted to a reader device via the antenna;
    determining, based on the unique identifier, configuration parameters associated with the tag device; and
    storing, in at least one memory in the reader device, at least a portion of the configuration parameters in association with the unique identifier, wherein the portion of the configuration parameters includes calibration information associated with the sensor, such that measured values can be determined based on the sensor readings and the calibration information;
    receiving, by the reader device, data from the tag device, wherein the data is representative of the unique identifier and a sensor reading obtained by the sensor;
    retrieving, by the reader device, the portion of the configuration parameters from the at least one memory based on the unique identifier; and
    determining, by the reader device, a measured value based on the sensor reading and the portion of the configuration parameters.

2. The method of claim 1, wherein the portion of the configuration parameters is a first portion of the configuration parameters, the method further comprising:
    communicating, by the reader device, at least a second portion of the configuration parameters to the tag device.

3. The method of claim 2, wherein the second portion of the configuration parameters relates to configuring at least one component of the tag device.

4. The method of claim 3, wherein the at least one component comprises at least one of an electronic oscillator, a radio frequency transceiver, a voltage reference, or a current reference.

5. The method of claim 1, wherein the obtaining is performed by a mobile computing device.

6. The method of claim 1, wherein obtaining the unique identifier comprises scanning an optical code associated with the tag device, wherein the optical code encodes the unique identifier.

7. The method of claim 1, wherein the tag device is in a body-mountable device.

8. The method of claim 7, wherein the body-mountable device is an eye-mountable device.

9. The method of claim 1, wherein obtaining the unique identifier comprises interrogating the tag device.

10. The method of claim 1, wherein determining, based on the unique identifier, the configuration parameters associated with the tag device comprises:
    transmitting the unique identifier to a server; and
    receiving the configuration parameters from the server.

11. A reader device, comprising:
    at least one radio frequency (RF) transceiver unit in the reader device;
    at least one processor in the reader device;
    at least one memory in the reader device, wherein the at least one memory stores instructions that upon execution by the at least one processor cause the reader device to perform operations comprising:
        obtaining a unique identifier associated with a tag device, wherein the tag device includes an antenna and a sensor configured to obtain sensor readings that can be wirelessly transmitted to the reader device via the antenna;
        determining, based on the unique identifier, configuration parameters associated with the tag device;
        storing, in the at least one memory in the reader device, at least a portion of the configuration parameters in association with the unique identifier, wherein the portion of the configuration parameters includes calibration information associated with the sensor, such that measured values can be determined based on the sensor readings and the calibration information;
        receiving data from the tag device, wherein the data is representative of the unique identifier and a sensor reading obtained by the sensor;
        retrieving the portion of the configuration parameters from the at least one memory based on the unique identifier; and
        determining, by the reader device, a measured value based on the sensor reading and the portion of the configuration parameters.

12. The reader device of claim 11, the operations further comprising:
    transmitting, via the at least one RF transceiver unit, an RF signal to the tag device, wherein the RF signal includes at least another portion of the configuration parameters.

13. The reader device of claim 12, wherein transmitting the RF signal to the tag device comprises transmitting the RF signal to the tag device using a radio-frequency identification (RFID) protocol.

14. The reader device of claim 11, wherein obtaining the unique identifier comprises scanning an optical code associated with the tag device, wherein the optical code encodes the unique identifier.

15. The reader device of claim 14, wherein the optical code includes a Quick Response (QR) code.

16. The reader device of claim 14, wherein the optical code encodes additional information associated with the tag device.

17. The reader device of claim 16, wherein the additional information includes a date associated with fabrication of the tag device.

18. The reader device of claim 16, wherein the additional information includes a lot number associated with fabrication of the tag device.

19. The reader device of claim 11, wherein obtaining the unique identifier comprises interrogating the tag device.

20. The reader device of claim 11, wherein determining, based on the unique identifier, the configuration parameters associated with the tag device comprises:
    transmitting the unique identifier to a server; and
    receiving the configuration parameters from the server.

21. A non-transitory computer readable medium having stored therein instructions executable by at least one processor in a reader device to cause the reader device to perform functions, the functions comprising:
    obtaining a unique identifier associated with a tag device, wherein the tag device includes an antenna and a sensor configured to obtain sensor readings that can be wirelessly transmitted to the reader device via the antenna;
    determining, based on the unique identifier, configuration parameters associated with the tag device; and
    storing, in at least one memory in the reader device, at least a portion of the configuration parameters in association with the unique identifier, wherein the portion of the configuration parameters includes calibration information associated with the sensor, such that measured values can be determined based on the sensor readings and the calibration information;
    receiving data from the tag device, wherein the data is representative of the unique identifier and a sensor reading obtained by the sensor;
    retrieving the portion of the configuration parameters from the at least one memory based on the unique identifier; and
    determining, by the reader device, a measured value based on the sensor reading and the portion of the configuration parameters.

22. The non-transitory computer readable medium of claim 21, the functions further comprising:
    communicating at least another portion of the configuration parameters to the tag device.

23. The non-transitory computer readable medium of claim 21, wherein determining, based on the unique identifier, the configuration parameters associated with the tag device comprises:
    transmitting the unique identifier to a server; and
    receiving the configuration parameters from the server.

24. The non-transitory computer readable medium of claim 21, wherein obtaining the unique identifier comprises scanning an optical code associated with the tag device, wherein the optical code encodes the unique identifier.

25. The non-transitory computer readable medium of claim 24, wherein the configuration parameters are encoded in the optical code.

26. The non-transitory computer readable medium of claim 21, wherein obtaining the unique identifier comprises interrogating the tag device.

* * * * *